May 3, 1932.   J. R. HUNT   1,856,482
MOVEMENT SHIFT AND FOCUSING TUBE ARRANGEMENT FOR MOTION PICTURE CAMERAS
Filed Nov. 19, 1929   3 Sheets-Sheet 1
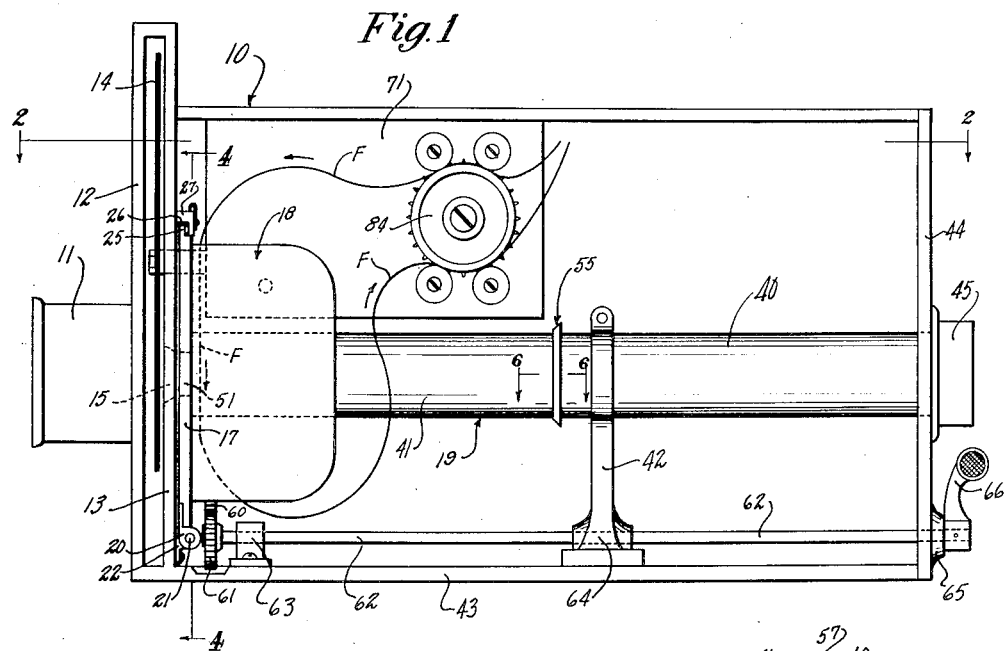
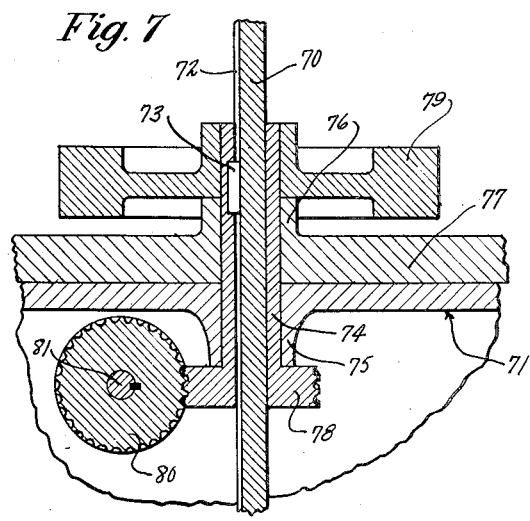
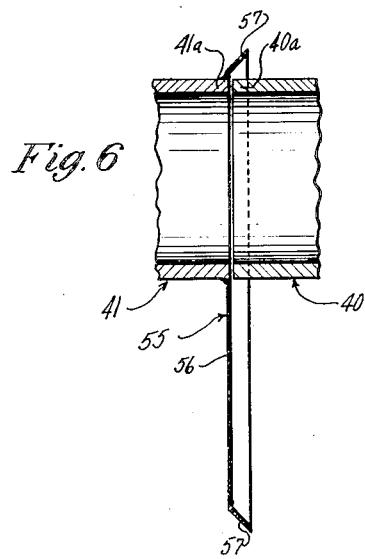
Inventor
John Roy Hunt.
Attorney.

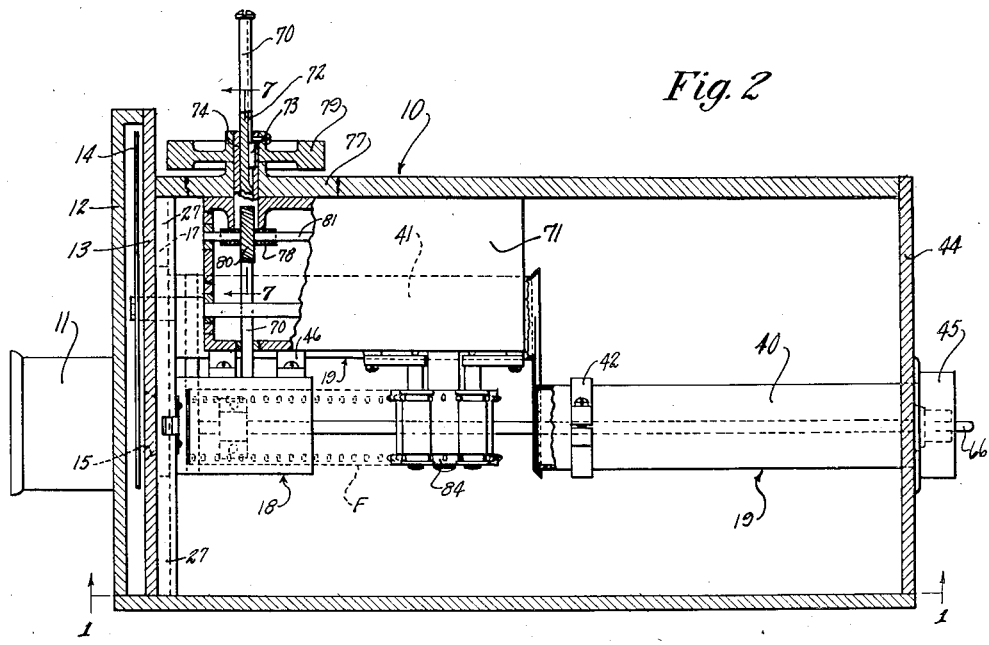

May 3, 1932. J. R. HUNT 1,856,482
MOVEMENT SHIFT AND FOCUSING TUBE ARRANGEMENT FOR MOTION PICTURE CAMERAS
Filed Nov. 19, 1929   3 Sheets-Sheet 3
Fig. 4
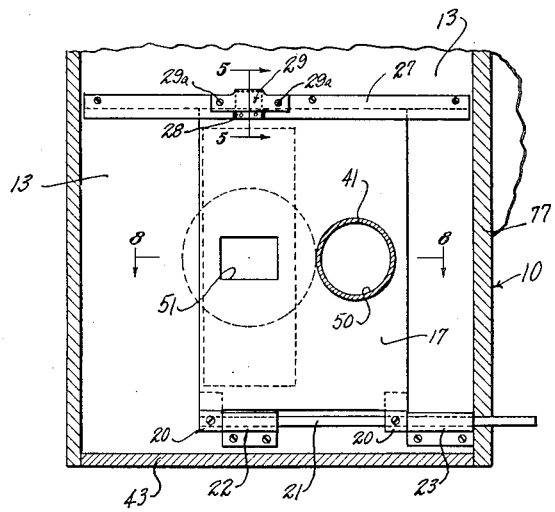
Fig. 8
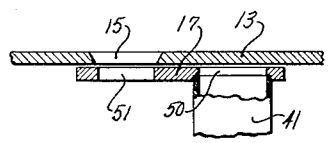
Fig. 5
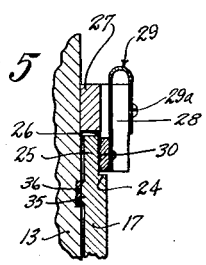
Inventor
John Roy Hunt.
Attorney.

Patented May 3, 1932

1,856,482

UNITED STATES PATENT OFFICE

JOHN ROY HUNT, OF LOS ANGELES, CALIFORNIA

MOVEMENT SHIFT AND FOCUSING TUBE ARRANGEMENT FOR MOTION PICTURE CAMERAS

Application filed November 19, 1929. Serial No. 408,249.

This invention relates generally to motion picture cameras, and more particularly to focusing devices and the provisions therefor in motion picture cameras. Strictly speaking the present invention is not limited to motion picture cameras, it being apparent that certain features of the invention are applicable to still cameras as well.

The focusing system hereinafter described embodies the general arrangement wherein the image from the photographic lens itself is viewed in the focusing device. This is accomplished, according to my preferred development, by mounting the film movement and a forward portion of the focusing device as a single unit in suitable guide ways in the camera, in such a manner that the film movement may be moved out of line with the photographic lens and the focusing device registered therewith, the usual ground glass or other image plane of the focusing device then occupying the exact position normally occupied by the photographic film passing through the film movement.

Certain features of the invention relate to a construction and arrangement of the focusing device and to its combination with the movement mechanism, with a view toward convenience of operation, simplicity and compactness.

Another feature of the invention relates to the provision of improved guide ways for the movable film movement and focusing device for insurance of the greatest accuracy in moving and positioning these units, and which will not bind due to temperature changes or become easily clogged with dirt.

Another feature resides in the driving connection between the film movement and its drive means, which connection remains unbroken as the movement is shifted from "taking" to "focusing" position.

The various features and advantages of the invention will be best understood from the following detailed description of a preferred embodiment thereof, reference for this purpose being had to the accompanying drawings, in which:

Fig. 1 is an elevation of a motion picture camera with the side wall thereof removed to show the application of the present invention thereto;

Fig. 2 is a horizontal section, parts being broken away, taken on line 2—2 of Fig. 1;

Fig. 3 is a view similar to Fig. 2, but showing the parts in another operative position;

Fig. 4 is a vertical section taken on line 4—4 of Fig. 1;

Fig. 5 is a vertical section taken on line 5—5 of Fig. 4;

Fig. 6 is a horizontal section taken on line 6—6 of Fig. 1;

Fig. 7 is a vertical section taken on line 7—7 of Fig. 2; and

Fig. 8 is a horizontal section of the carrier plate taken on line 8—8 of Fig. 4.

Referring now to the drawings, there is shown at 10 a camera with a photographic lens 11 mounted in the front wall 12 thereof. Horizontally spaced rearward of front wall 12 is a vertical partition 13, which supports the film movement and the forward end of the focusing tube, as hereinafter described, and between which and the front wall 12 is mounted the usual shutter 14. Wall 13 has an aperture 15 registered with lens 11, and through which the film is exposed and also through which the image of the photographic lens is viewed for focusing purposes.

Mounted to slide in horizontal guides provided on the inner face of wall 13 is a carrier plate 17, this carrier plate having mounted thereon the film movement, indicated at 18, and a portion of the focusing device 19, hereinafter more fully set forth. The slidable mounting for plates 17 is shown best in Figs. 1, 4 and 5, to which reference is now had. Plate 17 is provided at the opposite ends of its lower edge with brackets 20, which carry a transverse guide rod 21, rod 21 being supported and guided in a pair of bearings 22 and 23 mounted on wall 13. Bearing 22 is disposed between the pair of brackets 20, and by contact with these brackets provides a stop for the motion of plate 17 in both directions. Bearing 23 is conveniently mounted to the right of plate 17, as viewed in Fig. 4.

The upper edge of plate 17 is rabbeted at 24, and the tongue 25 thus formed slides freely in the groove 26 of a guide strip 27 secured to wall 13. Guide strip 27 is notched at 28 to provide for a spring member 29 fastened at 29a to guide strip 27 (see Figs. 4 and 5), and carrying at its lower end a block 30 urged into contact with the tongue 25 of plate 17, thus providing a snug sliding fit to the upper edge thereof. Plate 17 is provided near its upper edge with a horizontally extending, raised, machined surface 35 which rides on an opposed machined strip 36 set in wall 13 (see Fig. 5), thus insuring smoothness and precision of sliding action. Sufficient clearance is left between the upper edge of plate 17 and guide strip 27 to allow for expansion and contraction of plate 17 due to temperature changes, thereby precluding either binding or looseness as is common in prior constructions. It will be apparent that this construction permits of uniformity of sliding resistance under all weather conditions, and further is of such character as will not become easily clogged with dirt or sand.

The focusing device, generally indicated by the numeral 19, comprises a split tube containing suitable optical arrangements, not shown, the rearward portion 40 of the tube being stationarily mounted in the camera body in optical alinement with photographic lens 11, and the forward portion 41 thereof being carried by the movable plate 17. The forward portion is thus laterally movable with respect to the rearward portion, and may be moved between it and the photographic lens into the line of the optical axis of the focusing system, as hereinafter more fully set forth.

The rearward or stationary portion 40 of the focusing tube may be mounted, for instance, at its forward end upon a bracket 42 extending upwardly from the bottom wall 43 of the camera, and may be supported at its rearward end by extending through an opening in the rear wall 44 of the camera. The rear end of the tube is provided with the usual eye piece, indicated at 45. The forward or movable portion 41 of the focusing tube is mounted at the inside of film movement 18 with its forward end in light tight contact with carrier plate 17. For this purpose the focusing tube portion 41 may, though not necessarily so, be supported from the film movement itself, as by the clamps 46; while the forward end thereof may be set in plate 17, as indicated in Fig. 8. Plate 17 is apertured in front of the focusing tube, as at 50, and is provided with a similar aperture 51 in front of the photographic film F passing through the film movement. Apertures 50 and 51 are in the same horizontal plane with aperture 15 of camera wall 13, and consequently with the photographic lens 11; so that when the parts are in the "taking" position of Fig. 2 the aperture 51 before film movement 18 and the photographic film F carried thereby are registered with aperture 15 and lens 11, while when the parts are shifted to the focusing position of Fig. 3 the film movement is moved to one side and the aperture 50 before the movable portion 41 of the focusing tube registers with aperture 15 and lens 11. The movable portion of the focusing tube is thus brought into optical alinement with the photographic lens and with the rear or stationary portion 40 of the focusing tube, thereby forming a single tubular focusing device alined with the photographic lens, and through which can be viewed the image which will be taken upon the film after the movement is shifted back to the position of Fig. 2. I speak of the photographic lens 11 and the two tubular portions 40 and 41 of the focusing tube as being movable into optical alinement with each other, although in the form shown in the drawings the parts are then disposed in physical alinement as well. It will be recognized, however, that by means of suitable prisms, physical offset might be provided in the focusing tube; and therefore the various members referred to are spoken of as being movable merely into optical alinement, which is in reality the fundamental and characteristic requirement.

For the purpose of shielding or excluding light from the joints between the meeting ends of the two portions of the focusing tube when said portions are in alinement for focusing, and for the further purpose of excluding light from entering the camera through the stationary portion of the focusing tube when the two portions thereof are not in alinement, the following provisions are made. The rear end 41a of focusing tube portion 41 carries a light shield 55 in the form of a pan or plate 56 having rearwardly flanged edges 57, said plate being open over the area of focusing tube portion 41, and extending laterally outward therefrom to cover the open end 40a of focusing tube portion 40 when the parts are in the position of Fig. 2, as shown. Plate 56 is thus carried closely adjacent end 40a while in the position of Fig. 2 and during movement to the position of Fig. 3; but as focusing tube portion 41 reaches the position of Fig. 3 the open end 40a of portion 40 comes within the opening in plate 56 and finally into full register with the open end of portion 41, in which position the focusing device becomes operative. The flange 57 aids at all times in excluding light from the tube. Thus when the parts are in the position of Fig. 2 light from outside the camera is prevented from entering through the rearward focusing tube by virtue of the presence of plate 56 against its open inner end: and when the parts are in the position of Fig. 3 the flange 57 aids in forming a light tight joint between the two portions of the focusing tube.

Referring now particularly to Fig. 1, means for shifting the film movement and the forward portion of the focusing tube between the "taking" and "focusing" positions of Figs. 2 and 3 will be described. Secured to the under side of film movement 18 is a rack 60 which meshes with a pinion 61 mounted on the end of a shaft 62, said shaft being journaled in bearings 63, 64 and 65, as shown, and extending through the rear wall 44 of the camera, where it is provided at its outer end with an actuating handle 66. The size of pinion 61 is preferably such that rotation of handle 66 through, for instance, 180° moves the film movement and focusing tube between the extreme positions of Figs. 2 and 3. Then, knowing that a certain position of handle 66, say upward, corresponds to the "taking" position of the camera, while the downward position of the handle corresponds to the "focusing" position, a glance at the position of handle 66 instantly tells the operator whether his camera is in position for "taking" or for "focusing".

Referring now particularly to Figs. 2, 3 and 7, the numeral 70 indicates the drive shaft for the film movement 18, shaft 70 extending through and being journaled in suitable bearings in a gear case 71. The outer end of shaft 70 is cut with a key way 72, and is splined by means of key 73 within the bore of a hollow shaft 74. Shaft 74 is journaled in suitable bearings 75 and 76 in gear case 71 and wall 77 of the camera, respectively, and has adjacent bearing 75 a spiral gear 78, and adjacent bearing 76 a fly wheel 79. Shaft 70 is driven through the medium of hollow shaft 74 by a spiral gear 80 meshing with spiral gear 78, gear 80 being mounted on a shaft 81 driven by any usual means, not shown.

It may be seen that according to this arrangement the driving connection between the drive means of the camera and the film movement is not broken as the movement is shifted from the position of Fig. 2 to the focusing position of Fig. 3, shaft 70 simply sliding axially within hollow shaft 74 but remaining drivingly locked thereto.

Mounted on the side of gear case 71 and disposed in line with film movement 18 when the movement is in the "taking" position of Fig. 2 is a film sprocket 84, the film F passing from the usual magazine, not shown, over the top of this sprocket, down through film movement 18, and around the under side of sprocket 84 back to the magazine. Sufficient slack is left in the film between the sprocket and movement 18 that when the movement is shifted to the position of Fig. 3 the film simply swings sidewise to accommodate this movement, the disposition of the parts and the slack left in the film being such that the film is not sharply kinked or buckled during this operation.

Although my preferred embodiment includes in combination all of the features described above, it will be apparent that certain sub-combinations of my invention will have utility alone or in combination with other general arrangements. As such an instance, in some situations it may be feasible to embody the focusing device as a single unit shiftable as a whole with the film movement; and such an arrangement is contemplated within the scope of some of my broader claims.

It will be understood the drawings and description are to be considered merely as illustrative of and not restrictive on the broader claims appended hereto, for various changes in design, structure and arrangement may be made without departing from the spirit and scope of said claims.

I claim:

1. In a camera having a body, a photographic lens mounted therein, and means for supporting a film in alinement with said lens, the combination of a split focusing tube comprising a rear portion stationarily mounted within the body of the camera in optical alinement with the photographic lens, and a forward portion laterally movable in the camera with respect to said rear portion, means for moving the film out of alinement with the lens and for moving the forward portion of the focusing tube into optical alinement with the lens and the rear portion of the focusing tube.

2. In a motion picture camera having a body and a photographic lens mounted therein, the combination of a film movement adapted normally to occupy a position in alinement with said lens and to move a film through the image plane thereof, a split focusing tube comprising a rear portion stationarily mounted in the body of the camera in optical alinement with the photographic lens, and a forward portion mounted with and to one side of said movement, and means for laterally shifting said movement and the forward portion of the focusing tube so that the movement takes the film out of alinement with the photographic lens and the forward portion of the focusing tube is moved into optical alinement with the lens and the rear portion of the focusing tube.

3. In a motion picture camera having a body and a photographic lens mounted therein, the combination of a film movement adapted normally to occupy a position in alinement with said lens and to move a film through the image plane thereof, a split focusing tube comprising a rear portion stationarily mounted in the body of the camera in optical alinement with the photographic lens, and extending at its rear end outside the camera body, and a forward portion mounted with and to one side of said movement, and means for laterally shifting said movement and the forward portion of the focusing tube so that the movement takes the film out of alinement with the photographic lens and the forward portion of the focusing tube is moved into optical alinement with the lens and the rear portion of the focusing tube.

4. In a motion picture camera having a body and a photographic lens mounted therein, the combination of a film movement adapted normally to occupy a position in alinement with said lens and to move a film through the image plane thereof, means for laterally shifting said film movement out of alinement with said lens, a split focusing tube comprising a rear portion stationarily mounted in the body of the camera in optical alinement with the photographic lens, and a forward portion shiftably mounted with and to one side of said film movement and adapted, when said film movement is shifted out of alinement with said lens, to be carried into optical alinement with said lens, and said rear focusing tube portion, and to fit end to end in substantial light excluding relation with said rear focusing tube portion.

5. In a motion picture camera having a body and a photographic lens mounted therein, the combination of a film movement adapted normally to occupy a position in alinement with said lens and to move a film through the image plane thereof, means for laterally shifting said movement out of alinement with said lens, a split focusing tube comprising a rear portion stationarily mounted in the body of the camera in optical alinement with the photographic lens and extending at its rear end outside the camera body, and a forward portion shiftably mounted with and to one side of said film movement and adapted, when said film movement is shifted out of alinement with said lens, to be carried into optical alinement with said lens and said rear focusing tube portion, and a light shield carried by the forward focusing tube portion covering the inside end of the rear focusing tube portion when said forward focusing tube portion is not registered therewith.

6. In a motion picture camera having a body and a photographic lens mounted therein, the combination of a film movement adapted normally to occupy a position in alinement with said lens and to move a film through the image plane thereof, means for laterally shifting said movement out of alinement with said lens, a split focusing tube comprising a rear portion stationarily mounted in the body of the camera in optical alinement with the photographic lens and extending at its rear end outside the camera body, and a forward portion shiftably mounted with and to one side of said film movement and adapted, when said film movement is shifted out of alinement with said lens, to be carried into optical alinement with said lens and said rear focusing tube portion, and a cover plate extending laterally from the forward focusing tube portion and covering in light excluding relation that area of the inner end of the rear focusing tube portion not registered with the forward focusing tube portion.

7. In a motion picture camera having a body and a photographic lens mounted therein, the combination of a film movement adapted normally to occupy a position in alinement with said lens and to move a film through the image plane thereof, means for laterally shifting said film movement out of alinement with said lens, and a focusing device shiftably mounted with said film movement and adapted, when said film movement is shifted out of alinement with said lens, to be carried into optical alinement with said lens.

8. In a motion picture camera having a body frame and a photographic lens mounted therein, the combination of a carrier plate laterally slidable in said body frame behind said lens, a film movement carried by said carrier plate and adapted to move a film through the image plane of said lens, a focusing tube carried by said carrier plate, and means for laterally shifting the carrier plate in the camera whereby either the film carried by the film movement or the focusing tube may be optically alined with the photographic lens.

9. In a motion picture camera having a body frame and a photographic lens mounted therein, the combination of a carrier plate laterally slidable in said body frame behind said lens, a film movement carried by said carrier plate and adapted to move a film through the image plane of said lens, a split focusing tube including a forward portion carried by said carrier plate, means for laterally shifting the carrier plate in the camera whereby either the forward portion of the focusing tube or the film carried by the film movement may be optically alined with the photographic lens, said split focusing tube also including a rearward portion stationarily mounted in the body of the camera in optical alinement with the photographic lens and adapted to fit end to end with the movable forward focusing tube portion when said portion is alined with the photographic lens.

10. In a motion picture camera having a body frame and a photographic lens mounted therein, the combination of a carrier plate laterally slidable in said body frame behind said lens, a film movement carried by said carrier plate and adapted to move a film through the image plane of said lens, a split focusing tube including a forward portion carried by said carrier plate, said plate having a pair of apertures, one located before the film passing through said film movement and the other located before said forward focusing tube portion, means for laterally shifting the carrier plate in the camera whereby either of said apertures may be alined with the photographic lens, said split focusing tube also including a rearward portion stationarily mounted in the body of the camera in optical alinement with the photographic lens and adapted to fit end to end with the movable forward focusing tube portion when said portion is alined with the photographic lens.

11. In a motion picture camera having a body frame and a photographic lens mounted therein, the combination of a carrier plate laterally slidable in said body frame behind said lens, horizontal guideways in the body frame for the top and bottom edges of said carrier plate including, for one of said edges, bearings and a rod axially slidable therethrough, and means providing a groove adapted to take slidably the other of said edges, a film movement carried by said carrier plate and adapted to move a film through the image plane of said lens, a focusing tube carried by said carrier plate, and means for laterally shifting the carrier plate in said guideways whereby either the film carried by the film movement or the focusing tube may be optically alined with the photographic lens.

12. In a motion picture camera having a body frame and a photographic lens mounted therein, the combination of a carrier plate laterally slidable in said body frame behind said lens, one edge of said carrier plate mounted slidably on a shaft, the other edge thereof being confined by a spring against a bearing face, a film movement carried by said carrier plate and adapted to move a film through the image plane of said lens, a focusing device carried by said carrier plate, and means for laterally shifting the carrier plate in said guide ways whereby either the film carried by the film movement or the focusing device may be optically alined with the photographic lens.

13. In a motion picture camera having a body frame and a photographic lens mounted therein, the combination of a carrier plate laterally slidable in said body frame behind said lens, one edge of said carrier plate mounted slidably and rotatably on a shaft, the other edge thereof being confined by a spring against a bearing face, a film movement carried by said carrier plate and adapted to move a film through the image plane of said lens, a focusing device carried by said carrier plate, and means for laterally shifting the carrier plate in said guideways whereby either the film carried by the film movement or the focusing device may be optically alined with the photographic lens.

14. In a motion picture camera having a body and a photographic lens mounted therein, the combination of a film movement adapted normally to occupy a position in alinement with said lens and to move a film through the image plane thereof, means for shifting said film movement and the film carried thereby laterally out of alinement with said photographic lens, and drive means for said film movement mounted in the camera body separately of the shiftable film movement but in constant driving engagement therewith.

15. In a motion picture camera having a body and a photographic lens mounted therein, the combination of a film movement adapted normally to occupy a position in alinement with said lens and to move a film through the image plane thereof, means for shifting said film movement and the film carried thereby laterally out of alinement with said photographic lens, a focusing device shiftably mounted with said film movement and adapted, when said film movement is shifted out of alinement with said lens, to be carried into optical alinement with said lens, and drive means for said film movement mounted in the camera body separately of the shiftable film movement but in constant driving engagement therewith.

16. In a motion picture camera having a body and a photographic lens mounted therein, the combination of a film movement adapted normally to occupy a position in alinement with said lens and to move a film through the image plane thereof, means for shifting said film movement and the film carried thereby out of alinement with said photographic lens, drive means for said film movement mounted in the camera body separately of the shiftable film movement, a drive shaft for the film movement between said drive means and said movement extending in a line parallel to the direction of shifting of said movement, and a splined driving connection at one end of said drive shaft to permit shifting of the film movement without disengaging the drive means therefore.

17. In a motion picture camera having a body and a photographic lens mounted therein, the combination of a film movement adapted normally to occupy a position in alinement with said lens and to move a film through the image plane thereof, means for shifting said film movement and the film carried thereby out of alinement with said photographic lens, a focusing device shiftably mounted with said film movement and adapted, when said film movement is shifted out of alinement with said lens, to be carried into optical alinement with said lens, drive means for said film movement mounted in the camera body separately of the shiftable film movement, a drive shaft for the film movement between said drive means and said movement extending in a line parallel to the direction of shifting of said movement, and a splined driving connection at one end of said drive shaft to permit shifting of the film movement without disengaging the drive means therefore.

18. In a motion picture camera having a body and a photographic lens mounted therein, the combination of a film movement adapted normally to occupy a position in alinement with said lens and to move a film through the image plane thereof, a split focusing tube comprising a rear portion stationarily mounted in the body of the camera in optical alinement with the photographic lens, and a forward portion mounted with and to one side of said movement, means for laterally shifting said movement and the forward portion of the focusing tube so that the movement takes the film out of alinement with the photographic lens and the forward portion of the focusing tube is moved into optical alinement with the lens and the rear portion of the focusing tube and drive means for said film movement mounted in the camera body separately of the shiftable film movement but constantly drivingly engaged therewith.

In witness that I claim the foregoing I have hereunto subscribed my name this 24 day of October, 1929.

JOHN ROY HUNT.